US012679017B2

(12) United States Patent
Schnellenberger et al.

(10) Patent No.: US 12,679,017 B2
(45) Date of Patent: Jul. 14, 2026

(54) EXTRUSION NOZZLE WITH INSERT ELEMENT

(71) Applicant: EXELLIQ AUSTRIA GMBH, Nussbach (AT)

(72) Inventors: Manuel Schnellenberger, Michelsdorf (AT); Gerald Leitner, Kematen/Krems (AT); Ernst Kronegger, Nussbach (AT)

(73) Assignee: EXELLIQ AUSTRIA GMBH, Nussbach (AT)

( * ) Notice: Subject to any disclaimer, the term of this patent is extended or adjusted under 35 U.S.C. 154(b) by 507 days.

(21) Appl. No.: 17/788,711

(22) PCT Filed: Dec. 21, 2020

(86) PCT No.: PCT/EP2020/087483
§ 371 (c)(1),
(2) Date: Jun. 23, 2022

(87) PCT Pub. No.: WO2021/130176
PCT Pub. Date: Jul. 1, 2021

(65) Prior Publication Data
US 2023/0034650 A1　　Feb. 2, 2023

(30) Foreign Application Priority Data

Dec. 23, 2019　(DE) ..................... 10 2019 135 737.3

(51) Int. Cl.
B29C 48/30 (2019.01)
B29C 48/09 (2019.01)
B29C 48/12 (2019.01)

(52) U.S. Cl.
CPC .............. B29C 48/30 (2019.02); B29C 48/09 (2019.02); B29C 48/12 (2019.02)

(58) Field of Classification Search
CPC ......... B29C 48/09; B29C 48/10; B29C 48/11; B29C 48/12; B29C 48/2556;
(Continued)

(56) References Cited

U.S. PATENT DOCUMENTS 1,152,978 A　*　9/1915　Royle ..................... B29C 48/11
425/465
1,725,959 A　*　8/1929　Heath ........................ B28B 3/26
425/467
(Continued)

FOREIGN PATENT DOCUMENTS

CA　　　　2530966 A1　　2/2005
DE　　　　3216918 A1　　11/1983
(Continued)

OTHER PUBLICATIONS

DE Examination Report dated Jan. 12, 2024 as received in Application No. 10 2019 135 737.3.

*Primary Examiner* — Xiao S Zhao
*Assistant Examiner* — Joseph S Leyson
(74) *Attorney, Agent, or Firm* — Maschoff Brennan

(57) ABSTRACT

An extrusion nozzle for an extrusion device for extruding plastic profiles includes at least one nozzle plate which has at least one flow channel for plastic melt, and at least one insert element which is inserted into the at least one flow channel in order to reduce a cross-sectional area of the at least one flow channel through which the plastic melt can flow. At least one holding device is provided in the at least one flow channel, on which the at least one insert element is arranged.

12 Claims, 10 Drawing Sheets

(58) Field of Classification Search
  CPC ............ B29C 48/2562; B29C 48/2566; B29C
      48/25686; B29C 48/30; B29C 48/3001
  See application file for complete search history.

(56)                References Cited

U.S. PATENT DOCUMENTS 2,194,589  A  *  3/1940  Kunz ................. C06B 21/0075
                                                    425/467
    3,390,432  A  *  7/1968  Becker et al. ...... B29C 48/2556
                                                    425/382.4
    3,574,889  A  *  4/1971  Hire ..................... B29C 48/345
                                                    425/382.2
    4,504,210  A     3/1985  Titz et al.
    5,505,887  A     4/1996  Zdrahala et al.
 2004/0185132  A1*  9/2004  Looman, Jr. et al. .......................
                                              B29C 48/695
                                                    425/382.4
 2016/0361857  A1    12/2016  Reineke et al.

FOREIGN PATENT DOCUMENTS

DE        69519071  T2    6/2001
EP         0868991  A1   10/1998
EP         2253449  A1   11/2010
JP       2000301589  A   10/2000
JP         6559148  B2    8/2019

* cited by examiner

FIG 4B

EXTRUSION NOZZLE WITH INSERT ELEMENT

CROSS-REFERENCE TO A RELATED APPLICATION

This application is a National Phase Patent Application of International Patent Application Number PCT/EP2020/087483, filed on Dec. 21, 2020, which claims priority of German Patent Application Number 10 2019 135 737.3, filed on Dec. 23, 2019.

BACKGROUND

The proposed solution relates to an extrusion nozzle.

Such an extrusion nozzle is used in an extrusion device for the extrusion of plastic profiles. For the extrusion of plastic profiles, solid plastic material is melted into plastic melt in an extruder and then shaped by the extrusion nozzle. The extrusion nozzle may have a plurality of nozzle plates. The plastic profile may be, for example, a hollow chamber profile. Such plastic profiles may be intended for the production of window profiles. The plastic melt flows through a plurality of flow channels in the nozzle plates to form the plastic profile. At least one flow channel is assigned to an area of the plastic profile. A quantity of plastic melt flowing through the at least one flow channel is decisive for a wall thickness of the profile area. To optimise the wall thickness, at least one insert element can be inserted in the at least one flow channel. It is customary to clamp the at least one insert element in the at least one flow channel or to arrange it on a holding device outside the at least one flow channel. The at least one insert element reduces a cross-sectional area of the at least one flow channel through which the plastic melt can flow. As a result, the wall thickness of the plastic profile can be changed, in particular reduced. The at least one insert element is manufactured individually to fit the dimensions of the at least one flow channel, which may be cost-intensive.

SUMMARY

The object is to provide an extrusion nozzle with which the wall thickness of a plastic profile can be optimized easily, quickly and cost-effectively.

This object is solved by providing at least one holding device in the at least one flow channel, on which the at least one insert element is arranged. The at least one holding device is thus not arranged outside the at least one flow channel, but in the at least one flow channel. In particular, the at least one holding device may be arranged inside the at least one flow channel so that the at least one holding device is flowed around by the plastic melt during operation. An arrangement of the at least one holding device outside the at least one flow channel, for example in the form of a depression in the surface of the at least one flow channel, may lead to visible markings on the plastic profile. The arrangement of the at least one holding device inside the at least one flow channel may therefore improve the visual appearance of the plastic profile. The at least one flow channel may be defined by a surface circumferentially closed around the extrusion direction. The plastic melt may flow through the at least one flow channel along the surface. The at least one holding device may be provided on the overflowed surface. In one embodiment, the at least one holding device is moulded onto the surface of the at least one flow channel along which the molten plastic can flow. The at least one holding device may be integrally connected to the at least one nozzle plate. In particular, the at least one holding device may protrude from the surface into the at least one flow channel. Such a formed at least one holding device may allow the use of interchangeable, standardized and/or standardized insert elements.

In one embodiment, the at least one holding device is formed on one side of the at least one flow channel. The at least one holding device may be a fixed component of the at least one flow channel.

The at least one insert element can be used to influence the plastic melt. The at least one insert element can be used to change, in particular reduce, the cross-sectional area of the at least one flow channel through which the plastic melt can flow transversely to an extrusion direction along which the plastic melt can flow through the at least one flow channel. Variable here also means that a larger insert element can be exchanged for a smaller insert element and vice versa.

The cross-sectional area of the at least one flow channel through which the plastic melt can flow can be arranged in particular perpendicular to the extrusion direction. The at least one insert element can reduce a cavity formed by the at least one flow channel. In particular, a volume of the at least one flow channel through which the plastic melt can flow can be reduced by the at least one insert element. In the presence of the at least one insert element, the plastic melt can no longer flow freely through the at least one flow channel, but must flow around the at least one insert element. A volume of a plastic melt flowing through the at least one flow channel per unit time can be reduced by the at least one insert element.

The at least one insert element can be detachably inserted into the at least one holding device. The detachable insertion of the at least one insert element on the at least one holding device enables the at least one insert element to be changed at will and in particular several times without any risk of damage to the at least one nozzle plate.

In one embodiment, the at least one holding device forms at least one undercut, via which the at least one insert element is positively fixed to the at least one holding device perpendicular to an extrusion direction along which the plastic melt can flow through the at least one flow channel. The at least one insert element cannot be lifted off the at least one holding device due to the fixation to the at least one undercut. Furthermore, the at least one undercut can provide protection against penetration of molten plastic into a gap between the at least one holding device and the at least one insert element.

In one embodiment, the at least one holding device forms a receptacle into which the at least one insert element can be inserted. For example, the at least one insert element can be inserted into the receptacle on the at least one holding device for assembly along the extrusion direction.

The at least one insert element can be held in force-fitting and/or form-fitting manner on the holder along the extrusion direction. A force-fitting hold of the at least one insert element can be provided in particular against the extrusion direction. The plastic melt flowing through the at least one flow channel can in this case work towards a firmer hold of the at least one insert element on the at least one holding device. The receptacle may be conical along the extrusion direction. The receptacle can thus narrow along the extrusion direction. Due to the conical design of the receptacle, the at least one insert element can be held on the receptacle in a force-fitting and/or form-fitting manner. The design of the receptacle can enable a secure and fixed positioning of the at least one insert element on the receptacle.

In one embodiment, the at least one holding device comprises two webs projecting from a surface of the at least one flow channel. An undercut can be formed on each of the webs. The at least one insert element can be form-fittingly held on the webs via the undercut in a plane perpendicular to the extrusion direction and can be force-fittingly held by the two webs together in the extrusion direction.

The two webs can be extended obliquely to the extrusion direction. In particular, the two webs can be arranged symmetrically to each other in relation to the extrusion direction, so that the two webs are also extended obliquely to each other. The two webs may each be extended conically towards the extrusion direction. In one embodiment, the two webs are arranged mirror-symmetrically with respect to a plane which is perpendicular to the surface of the at least one flow channel and parallel to the extrusion direction. The directions of extension of the two webs may intersect in the extrusion direction.

In one embodiment, the at least one insert element is wedge-shaped along an extrusion direction along which the plastic melt can flow through the at least one flow channel. In particular, longitudinally extended flow surfaces of the at least one insert element, which protrude from the at least one holding device and along which the plastic melt flows during operation, can be formed obliquely to each other.

In addition or alternatively to the protection provided by the at least one undercut against penetration of molten plastic into the space between the at least one holding device and the at least one insert element, the wedge-shaped or conical configuration of the at least one insert element together with the conical configuration of the receptacle may provide protection against penetration of molten plastic into the space. In this regard, the at least one undercut can protect against penetration of plastic melt in a plane perpendicular to the extrusion direction, while the wedge-shaped or conical configuration of the at least one insert element and of the receptacle can protect against penetration of plastic melt along the extrusion direction. By providing the at least one undercut and/or by the conical design of the receptacle and the at least one insert element, a tightness between the receptacle and the at least one insert element can be ensured.

The at least one insert element and/or the at least one holding device are shorter than the at least one flow channel along the extrusion direction. This allows the at least one insert element to be flexibly used for a variety of plate thicknesses of the at least one nozzle plate. In the case of an insert element that is the same length as the at least one flow channel along the extrusion direction, unintended variations in the plate thickness of the at least one nozzle plate may result in a gap occurring between adjacent nozzle plates into which plastic melt can penetrate. As a result, the plastic melt can burn, which can lead to markings on the plastic profile. To remove the markings, it may be necessary to interrupt the extrusion process to remove and clean the at least one nozzle plate. Reworking of the at least one nozzle plate can likewise lead to a reduction in plate thickness and thus to gaps between adjacent nozzle plates. The insert elements to be used for the reworked nozzle plate would in this case also have to be reworked to adapt their length along the extrusion direction to the reduced plate thickness.

The at least one insert element can protrude beyond the at least one holding device on at least one side of the at least one holding device, in particular on two sides of the at least one holding device. This can also prevent the penetration of plastic melt into the space between the at least one insert element and the at least one holding device.

In one embodiment, the at least one insert element comprises a base part for arrangement on the at least one holding device and a head part for moulding the molten plastic. The at least one insert element may be arranged on the at least one holding device via the base part. The head part may protrude from the base part and the holding device. In use, the molten plastic may flow around the head part such that the molten plastic is formed on the head part.

The base part can be designed in cross-section, for example in a plane perpendicular to the extrusion direction, as a symmetrical trapezoid, possibly with rounded corners. Similarly, in cross-section in the same plane, the receptacle can also be formed as a symmetrical trapezoid, optionally with rounded corners, so that the base part can be inserted into the receptacle. A base surface of the base part may be wider in cross-section than a head surface of the base part from which the head part protrudes from the base part. Similarly, the receptacle may be bag-shaped to prevent molten plastic from entering a space between the base part and the holding device.

A degree of influence on a wall thickness of a profile area of the plastic profile can be controlled by the shape of the head part. In one embodiment, the head part protrudes in cross-section, for example in a plane perpendicular to the extrusion direction, in a tongue-shaped or T-shaped manner from the base part. A degree of influence on the wall thickness of the profile area of the plastic profile can alternatively or additionally be controlled by the number of insert elements arranged in the at least one flow channel.

For example, if an excessive wall thickness is detected in a profile area, the cross-section of the at least one flow channel can be reduced in a plane perpendicular to the extrusion direction by inserting one or more insert elements in at least one flow channel associated with the profile area. In addition to the surface of the flow channel, the plastic melt also flows along flow surfaces of the at least one insert element. As a result, a frictional resistance experienced by the plastic melt when flowing through the at least one flow channel can be increased. As a result, the molten plastic can be slowed down compared to the at least one flow channel without the at least one insert element. The at least one insert element can thus contribute to controlling a flow rate of the plastic melt in the at least one flow channel. The wall thickness of the profile region may be less at a lower flow velocity in the associated at least one flow channel compared to at least one flow channel without the at least one insert element. The result of using the at least one insert element may therefore be a reduced wall thickness of the profiled region. The influence on the wall thickness may scale with a size of the head part of the at least one insert element.

BRIEF DESCRIPTION OF THE DRAWINGS

In the following, embodiments of the extrusion nozzle are described with reference to figures.

FIG. 4B shows a cross-section through a holding device and an insert element.

DETAILED DESCRIPTION

Figure 1:
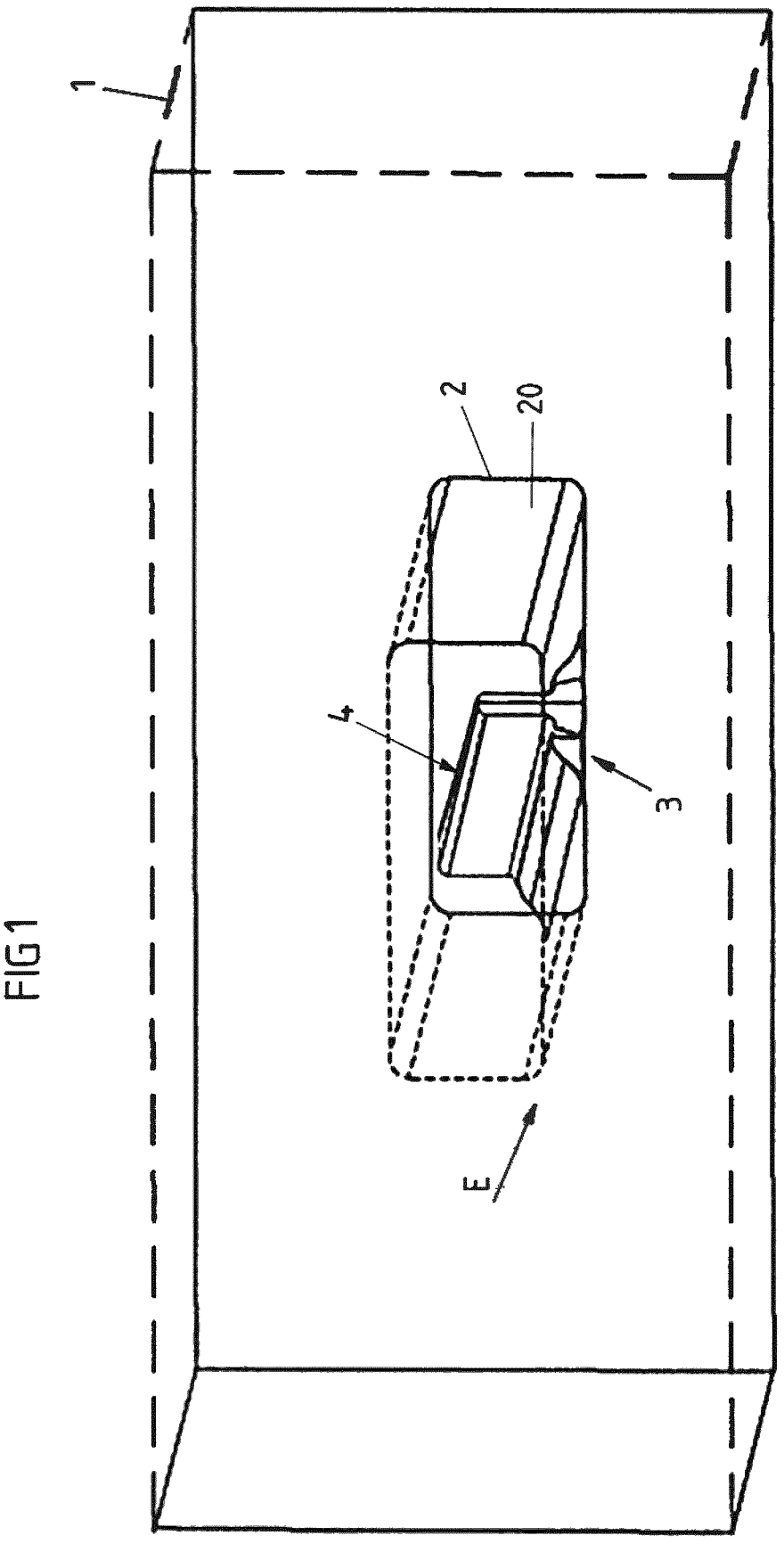
FIG. 1 shows a perspective view of a nozzle plate with a flow channel.

FIG. 1 shows a nozzle plate 1 with a flow channel 2 for plastic melt. An insert element 4 is inserted into the flow channel 2, which reduces the cross-sectional area of the flow channel 2 through which the plastic melt can flow. The plastic melt has a smaller volume available for flowing through the flow channel 2 due to the inserted insert element 4. The insert element 4 protrudes from a surface 20 of the flow channel 2 along which the plastic melt flows. It protrudes into the flow of the plastic melt. The molten plastic thus suffers frictional losses at the insert element 4, so that a flow velocity of the molten plastic is reduced. The insert element 4 projects from a first side of the flow channel 2 towards an opposite second side of the flow channel 2. A height of the insert element 4 above the surface 20 of the flow channel 2 at which the insert element 4 is arranged is less than a distance between the first and second sides. A distance between two sides of the flow channel 2 is therefore not completely filled by the insert element 4. In particular, the insert element 4 is only held on one side of the flow channel 2. The insert element 4 reduces the cross-sectional area through which the plastic melt can flow transversely to the extrusion direction E along which the plastic melt flows through the flow channel 2.

A holding device 3 is provided in the flow channel 2, on which the insert element 4 is arranged. The holding device 3 is designed to hold the insert element 4. In particular, the holding device 3 holds the insert element 4 against the extrusion direction E, so that the insert element 4 is not carried along by the plastic melt. The holding device 3 is arranged inside the flow channel 2. It protrudes from the surface 20 of the flow channel 2 in the direction of the plastic melt. The flow channel 2 forms an approximately cuboid-shaped cavity at the nozzle plate 1. The holding device 3 forms a projection into the flow channel 2 extending longitudinally along the extrusion direction E. The insert element 4 is clamped to the holding device 3. The insert element 4 is also longitudinally extended along the extrusion direction E. A cross-sectional area of the insert element 4 along the extrusion direction E is larger than a cross-sectional area of the insert element 4 transverse to the extrusion direction E.

Figure 2A:
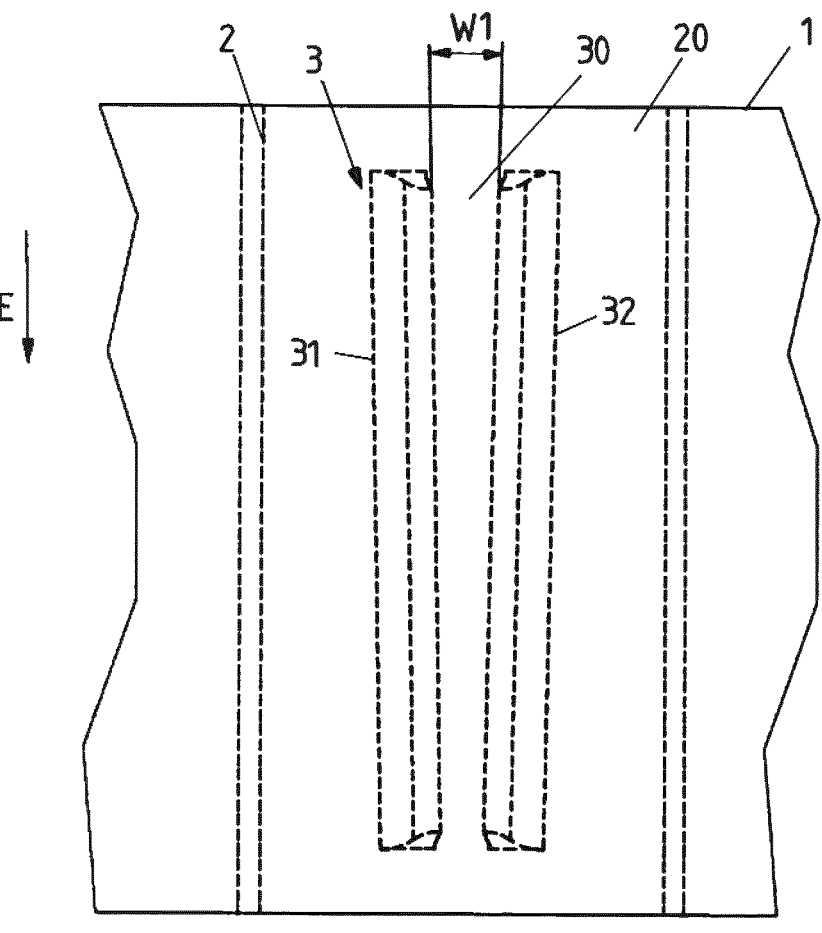
FIG. 2A shows a top view of a holding device.
Figure 2B:
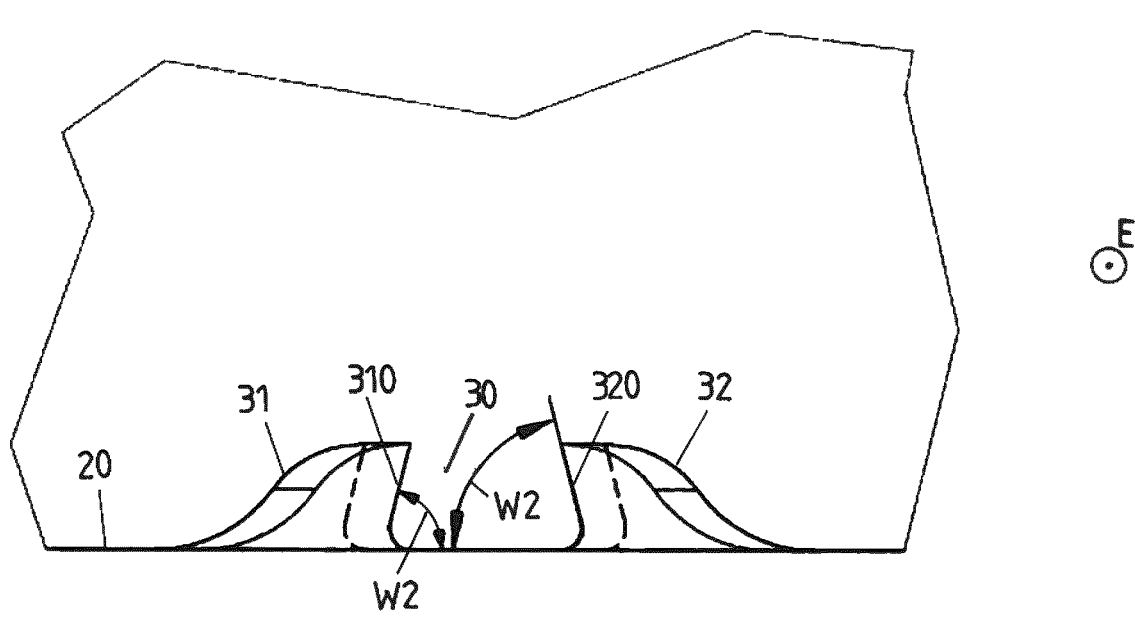
FIG. 2B shows a cross-section through a holding device.

FIG. 2A shows a top view of a section of the surface 20 of the flow channel 2 on which the holding device 3 is arranged. FIG. 2B shows a cross-section through the holding device 3. The holding device 3 is moulded onto the surface 20 of the flow channel 2 along which the plastic melt can flow. It comprises two webs 31, 32, each of which protrudes from the surface 20 in the shape of a ridge. A receptacle 30 for the insert element 4 is formed between the webs 31, 32. The insert element 4 can be held on the receptacle 30 along the extrusion direction E in a force-fitting and form-fitting manner.

Two undercuts are formed on the holding device 3, via which the insert element 4 can be form-fittingly fixed to the holding device 3. The undercuts form-fittingly fix the insert element 4 in particular in a plane perpendicular to the extrusion direction E. To form the undercuts, the webs 31, 32 each have a retaining section 310, 320, which is longitudinally extended along the extrusion direction E. The retaining sections 310, 320 each project obliquely from the surface 20 of the flow channel 2. An angle W2 between each of the retaining sections 310, 320 and the surface 20 is less than 90°. The retaining sections 310, 320 are inclined towards each other. This allows the insert element 4 to be held positively on the holding device 3 in a plane perpendicular to the extrusion direction E.

FIG. 2A shows that the webs 31, 32 are arranged on the surface along the extrusion direction E at an angle W1 to each other. In particular, the webs 31, 32 are not aligned parallel to each other. The angle W1 between the webs 31, 32 in a plane parallel to the surface 20 of the flow channel 2 on which the webs 31, 32 are arranged may be in an interval between 0.5° and 10°. The small angle W1 ensures that the receptacle 30 is wedge-shaped along the extrusion direction E. When plastic melt flows past the insert element 4 arranged on the holding device 3, the insert element 4 is pressed into the wedge-shaped receptacle 30 along the extrusion direction E by the plastic melt, so that the insert element 4 can be held on the receptacle 30 in such a way that it cannot be lost.

Figure 3B:
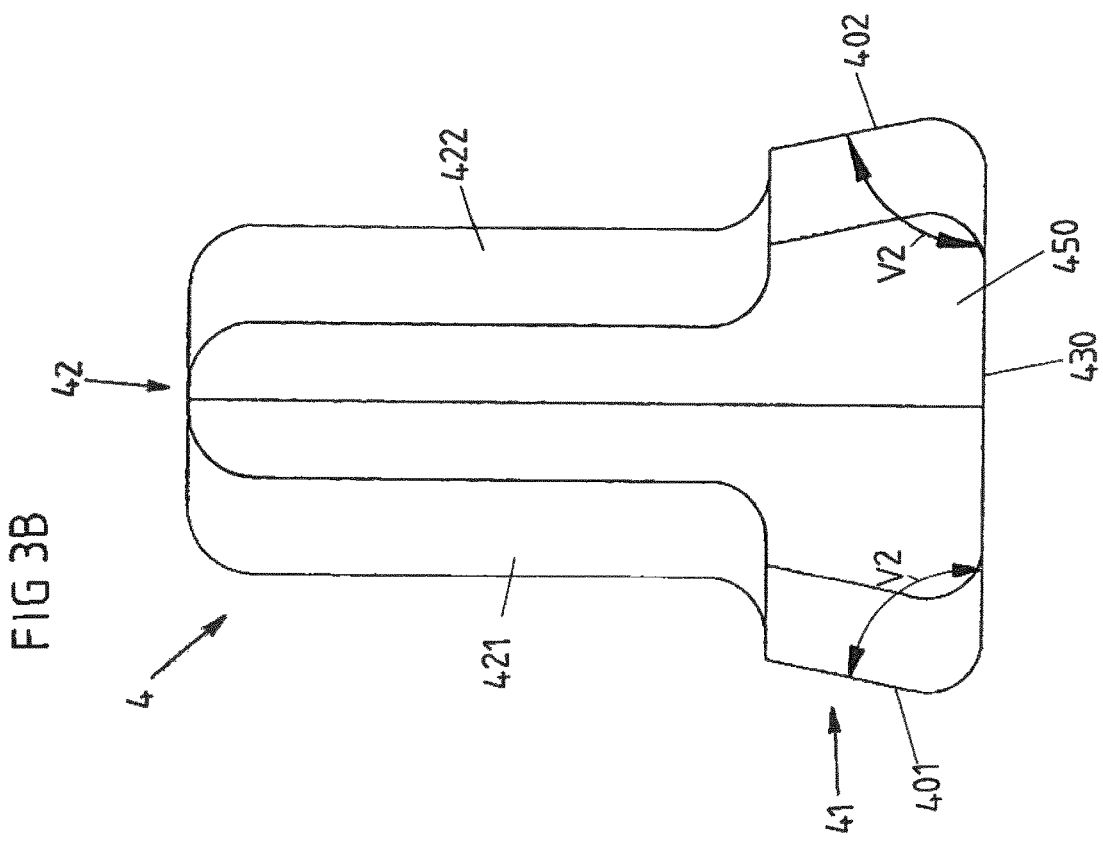
FIG. 3B shows a cross-section through an insert element.
Figure 3A:
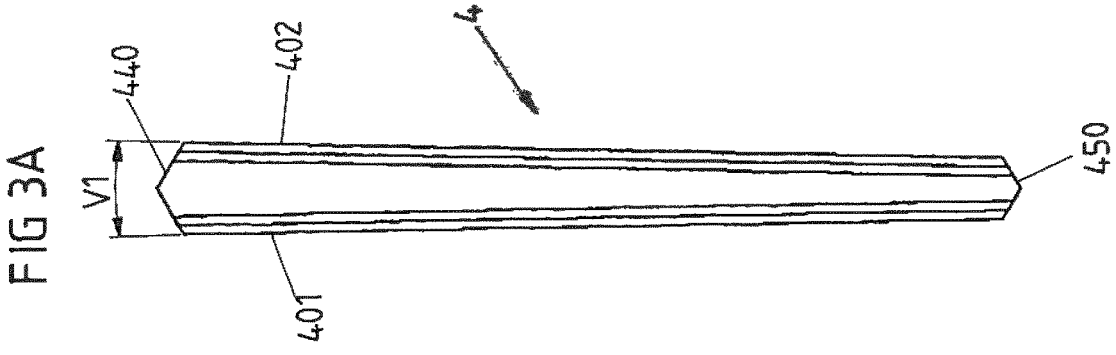
FIG. 3A shows a top view of an insert element.

FIG. 3A shows a top view of an insert element 4. The insert element 4 is wedge-shaped along the extrusion direction E. Two end faces 440, 450 of the insert element 4 along the extrusion direction E are formed at an obtuse angle to allow the plastic melt to flow past the end faces 440, 450. In this way, an undesirable accumulation of plastic melt on the end faces 440, 450, as would be conceivable and possible, for example, with flat end faces, can be prevented. If molten plastic accumulates on one of the end faces 440, 450, there is a risk that the molten plastic will burn. The end faces 440, 450 can of course protrude from the insert element 4 along the extrusion direction E in any shape. For example, at least one of the end faces 440, 450 can be rounded or formed at an acute angle.

Side sections 401, 402 of the insert element 4, each facing one of the webs 31, 32, are arranged at an angle V1 oblique to each other. To insert the insert element 4 into the receptacle 30 of the holding device 3, the insert element 4 is pushed between the two webs 31, 32. Because the two webs 31, 32 are arranged at an angle to each other and the insert element 4 is wedge-shaped, the holding device 3 and the insert element 4 can be wedged together.

The angle V1 at which the side sections 401, 402 in the insert element 4 in FIG. 3A are arranged obliquely to each other is greater than the angle W1 at which the webs 31, 32 in the holding device 3 in FIG. 2A are arranged to each other.

FIG. 3B shows a cross-sectional view of the insert element 4. The insert element 4 comprises a base part 41 for placement on the holding device 3 and a head part 42 for moulding the molten plastic. The base part 41 has a base surface 430 adjacent to the surface 20 of the flow channel 2. Two side sections 401, 402 protrude from the base surface 430. The side sections 401, 402 each form an angle V2 of less than 90° to the base surface 430. The side sections 401, 402 are each inclined towards each other. The angle V2 between the base surface 430 and the side sections 401, 402 is in each case greater than the angle W2 between the surface 20 of the flow channel 2 and the holding sections 310, 320 of the webs 31, 32, so that the insert element 4 can be wedged with the holding device 3.

Figure 4A:
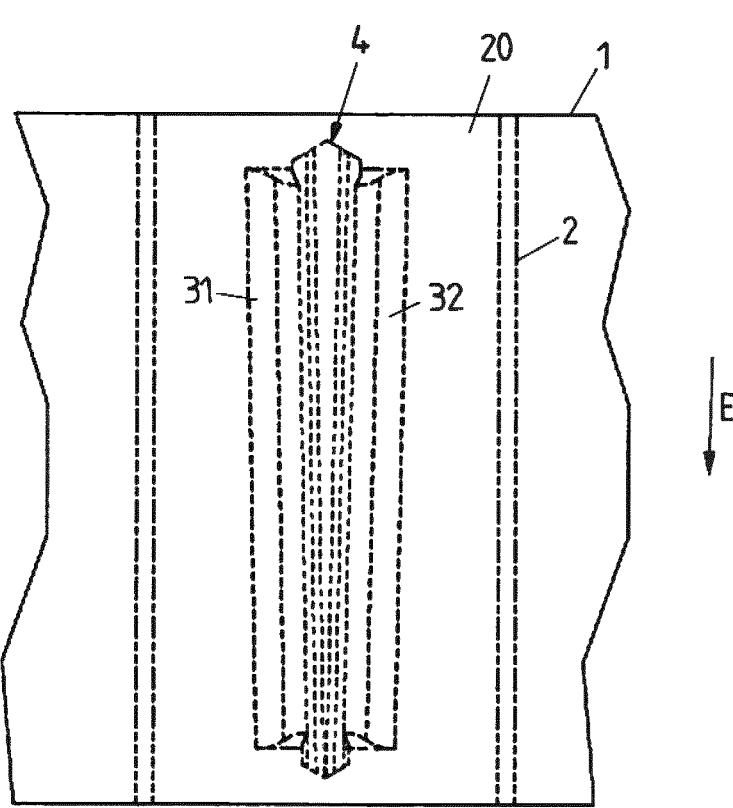
FIG. 4A shows a top view of a holding device on which an insert element is arranged.

FIG. 4A shows a top view of the holding device 3 with insert element 4 arranged on the holding device 3. The insert element 4 protrudes from the holding device 3 along the extrusion direction E on two sides. It is inserted between the two webs 31, 32 of the holding device 3 until further advancement along the extrusion direction E is no longer possible due to a decreasing width of the receptacle 30 along the extrusion direction E. The holding device 3 and the insert element 4 are arranged inside the flow channel 1. They also do not protrude beyond the flow channel 1.

Figure 4B:
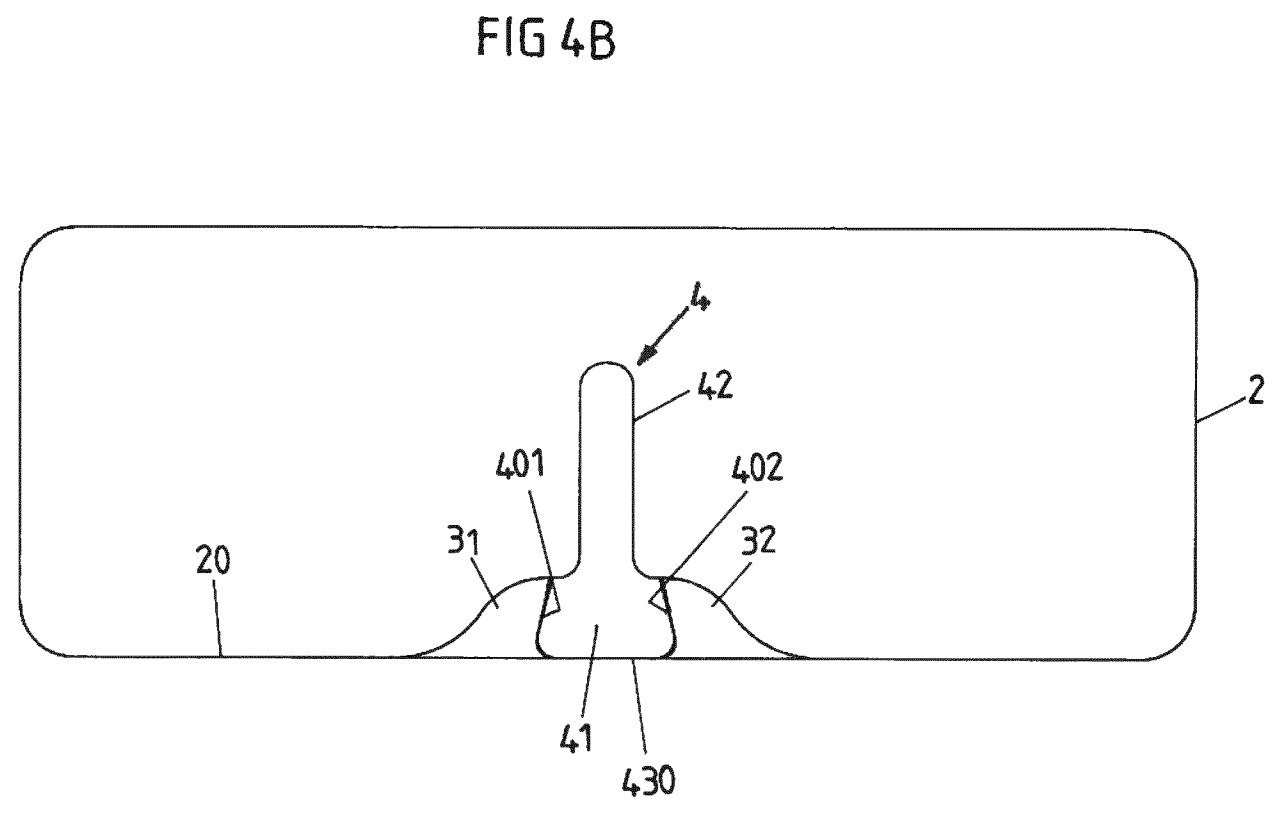

FIG. 4B shows a cross-section through the flow channel 2 with insert element 4 inserted therein. The holding device 3 is moulded onto the surface 20 of the flow channel 2. The insert element 4 is held to the holding device 3 via the base part 41. A first web 31 of the holding device 3 forms a first undercut for the base part, and a second web 32 of the holding device 3 forms a second undercut for the base part. A first retaining section 310 of the first web 31 is adjacent to a first side portion 401 of the base part 41. A second retaining section 320 of the second web 32 is adjacent to a second side portion 402 of the base part 41. As a result, the insert element 4 is releasably clamped between the two webs 31, 32 against the extrusion direction E.

FIG. 5A to FIG. 5D show different designs of the insert element 4. The base part 41 of the insert elements 4 shown is designed as an identical part, so that identical holding devices 3 can be used in each case to arrange the insert elements 4 on the flow channel 2. In particular, the base parts 41 are each wedge-shaped along the extrusion direction E. The different designs of the insert elements 4 can be used alone or in combination in at least one flow channel 2.

Figure 5A:
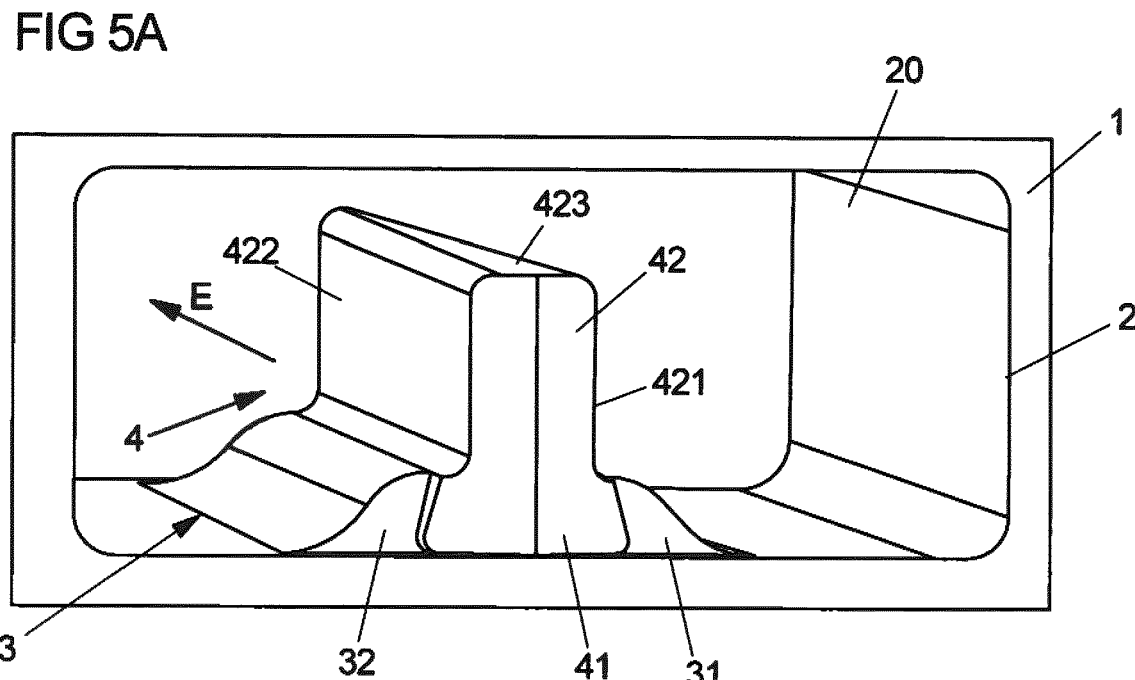
FIGS. 5A-5D show perspective views of a nozzle plate with a flow channel and an insert element.

The insert element 4 shown in FIG. 5A is wedge-shaped. In particular, it has a head part 42 which is wedge-shaped along the extrusion direction E and whose height above the base part 41 is constant. The head part 42 is wedge-shaped in a first plane along the extrusion direction E and parallel to the surface of the flow channel 2 on which the insert element 4 is arranged, and has a rectangular cross-sectional surface in a second plane along the extrusion direction E and perpendicular to the surface. The head part 42 has a first flow surface 421, 422 and a second flow surface 422, each projecting from the base part 41. The molten plastic can flow along each of the flow surfaces 421, 422. The first and second flow surfaces 421, 422 are connected to each other via a third flow surface 423 disposed on a side of the head part 42 remote from the base part 41. The third flow surface 423 decreases in size along the extrusion direction E so that a flow velocity of a molten plastic flowing past the insert element 4 can increase along the extrusion direction E.

Figure 5B:
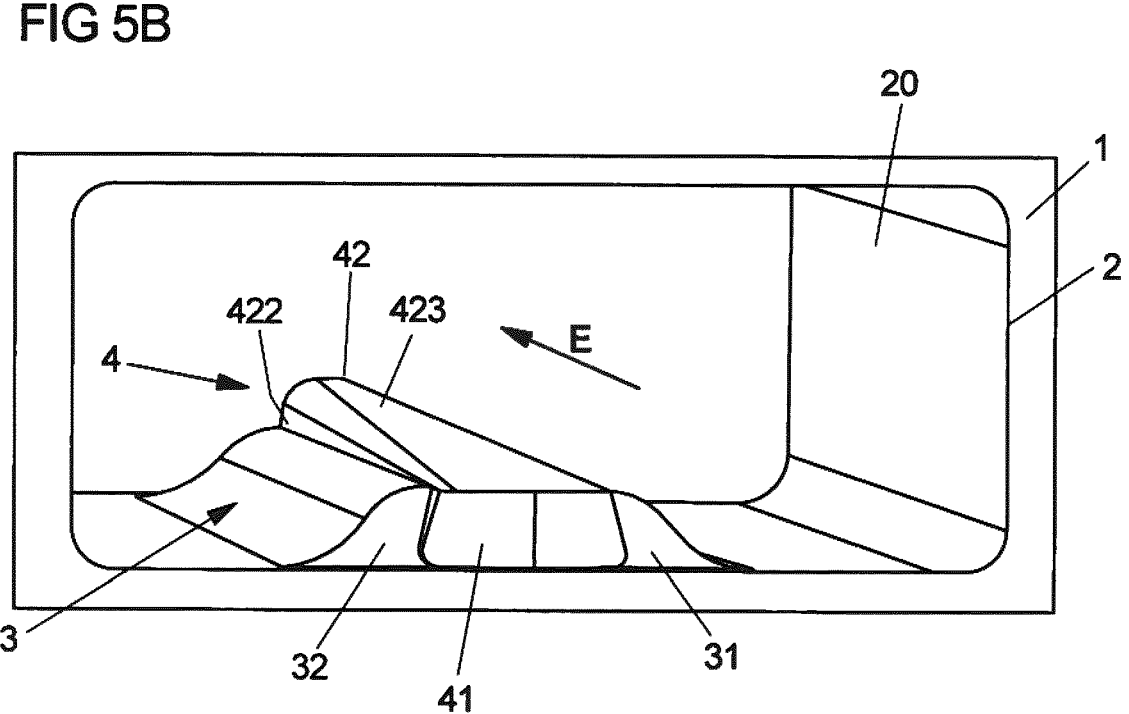

The insert element 4 shown in FIG. 5B has a head part 42 whose height above the base part 41 increases along the extrusion direction E. Due to the gradually increasing height of the head part 42 above the base part 41, a shape of the molten plastic flowing through the flow channel 2 can be gradually changed along the extrusion direction E. In addition, a flow velocity of the molten plastic flowing past the insert element 4 can decrease along the extrusion direction E.

Figure 5C:
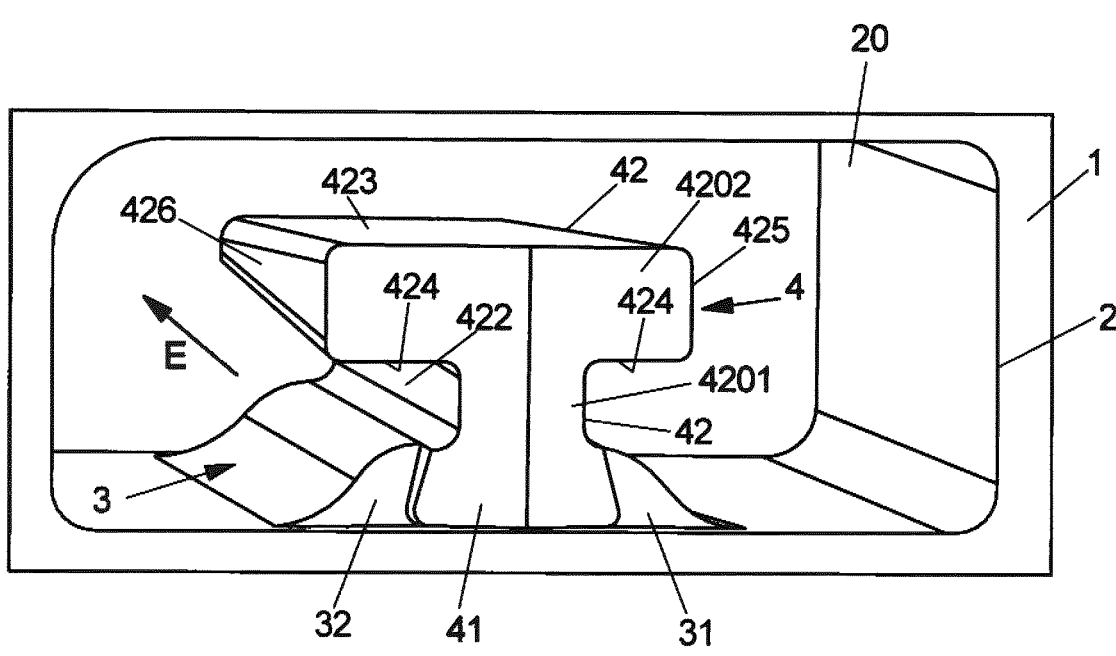

The insert element 4 shown in FIG. 5C is elongated along the extrusion direction E and has a head part 42 with a first head part section 4201 extending in a plane perpendicular to the extrusion direction E along a first direction. The head part 42 has a second head part portion 4202 extending in a plane perpendicular to the extrusion direction E along a second direction arranged perpendicular to the first direction. The head part 42 is formed symmetrically relative to a plane along the extrusion direction E. In particular, the head part 42 is T-shaped in cross-section in the plane perpendicular to the extrusion direction. The first head part section 4201 protrudes from the base part 41 along the first direction. The second head part section 4202 is arranged on the first head part section 4201 at a side opposite to the base part 41. A width of the second head part section 4202 is determinable independently of a size of the holding device 3 or the base part 41. Thus, any shaped cross-sectional area of the flow channel 2 can be filled by the head part 42.

The first head part section 4201 has first and second flow surfaces 421, 422. The first and second flow surfaces 421, 422 are arranged obliquely to each other along the extrusion direction E and protrude from the base part 41. The second head part section 4202 has four flow surfaces 423, 424, 425, 426 along which the molten plastic can flow. Two flow surfaces 423, 424, 425, 426 are located opposite each other. A third flow surface 423 facing away from the base part 41 and a fourth flow surface 424 facing the base part 41 are arranged at an angle to each other. The first head part section 4201 adjoins the fourth flow surface 424, thereby dividing the fourth flow surface 424 into two portions. A distance between the third and fourth flow surfaces 423, 424 decreases along the extrusion direction E. The third and fourth flow surfaces 423, 424 are connected via fifth and sixth flow surfaces 425, 426 that face each other. A distance between the fifth and sixth flow surfaces 425, 426 decreases along the extrusion direction E. The second head part section 4202 is wedge-shaped in two planes, which are in particular perpendicular to each other and parallel to the extrusion direction E. The second head part section 4202 is wedge-shaped in two planes. In principle, the second head part section 4202 can also have four parallel flow surfaces or at least one pair of parallel flow surfaces.

Figure 5D:
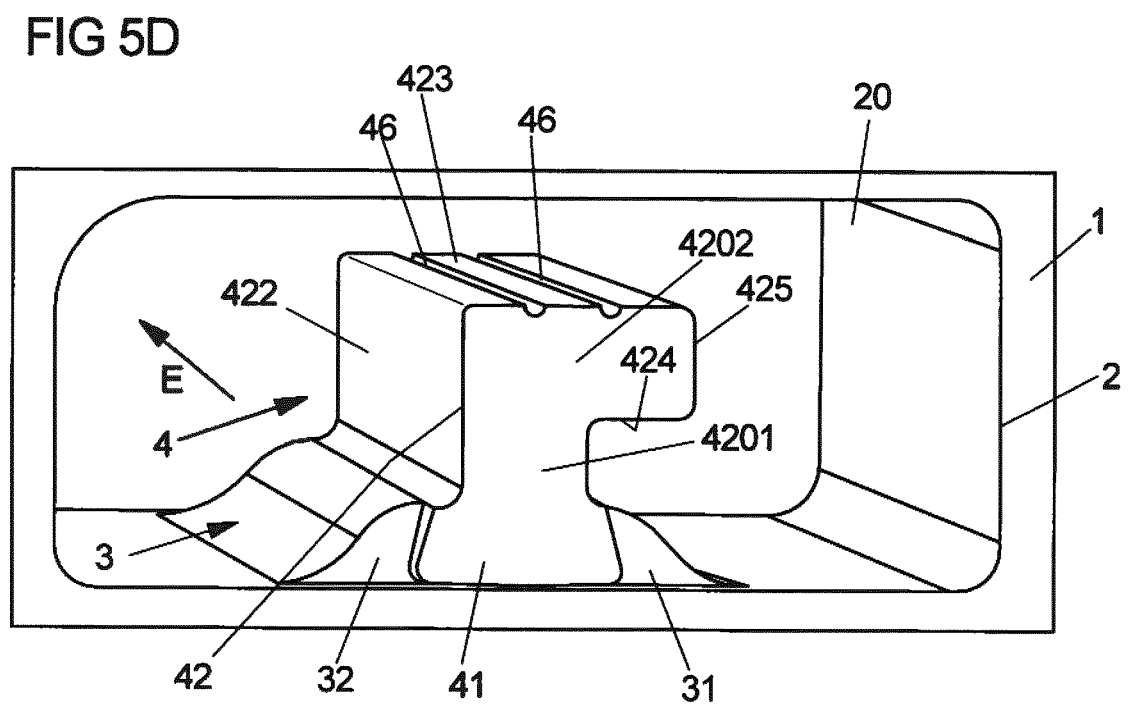

The insert element 4 shown in FIG. 5D has a head part 42 which is asymmetrical relative to the plane along the extrusion direction E. In particular, the head part 42 is L-shaped in cross-section in the plane perpendicular to the extrusion direction. In particular, the head part 42 is L-shaped in cross-section in the plane perpendicular to the extrusion direction.

The second flow surface 422 is extended along a plane from the first head part section 4201 to the second head part section 4202. The third flow surface 423 has two grooves 46 for easy visual identification of the insert element 4. In principle, any number of grooves 46 may be provided to distinguish different embodiments of the insert element 4. The insert element according to the embodiment example of FIG. 5D fills a smaller cross-sectional area of the flow channel 2 than the insert element 4 according to the embodiment example of FIG. 5C. By selecting differently shaped insert elements 4, the filled cross-sectional area of the flow channel 2 for influencing the plastic melt can therefore be determined.

Figure 6:
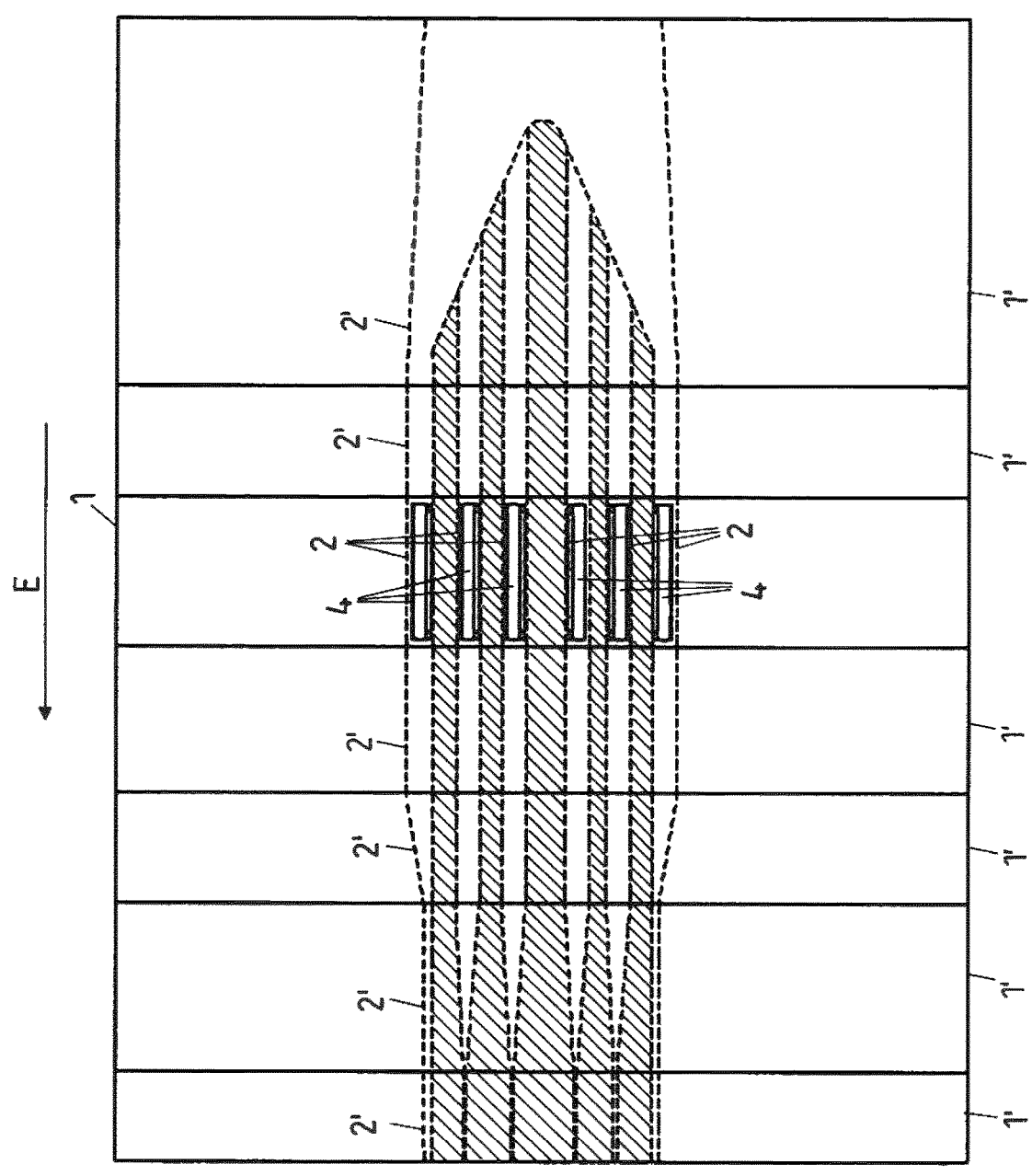
FIG. 6 shows a view of an extrusion nozzle with multiple nozzle plates.

FIG. 6 shows an extrusion nozzle with seven nozzle plates 1, 1', which have six flow channels 2, 2' for plastic melt. A holding device 3 is arranged in each of the flow channels 2 on one of the nozzle plates 1. An insert element 4 is provided on the holding device 3 in each case, through which the flow channel 2 is reduced in size. As a result, only a fraction of the plastic melt that would flow through a flow channel 2 without the insert element 4 can flow through each of the reduced flow channels 2. Holding devices 4 and/or insert elements 4 can be provided on each of the flow channels 2, 2' or also only on a part of the flow channels 2, 2'.

Figure 7:
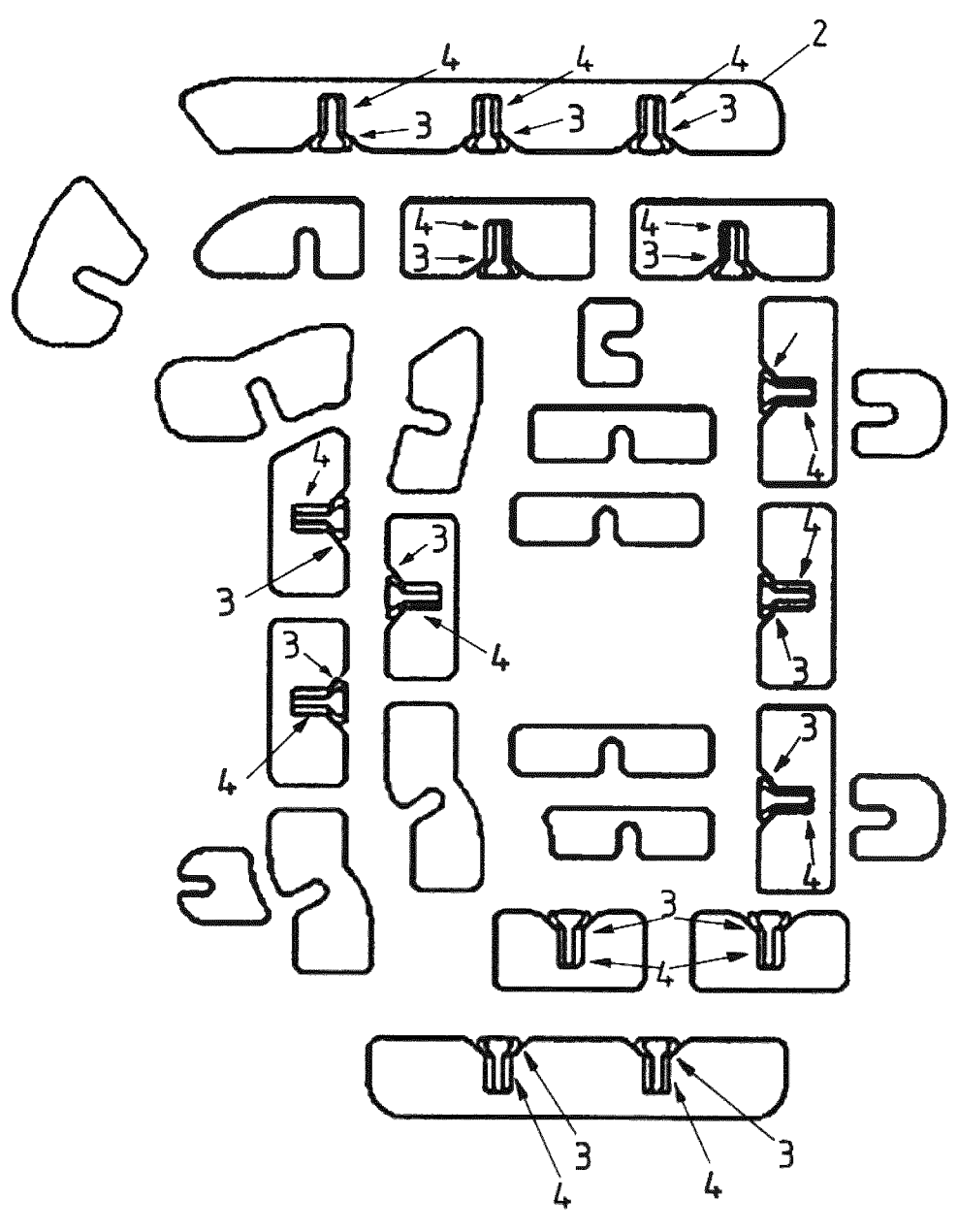
FIG. 7 shows a cross-section through a nozzle plate with several flow channels.

FIG. 7 shows a cross-section through a nozzle plate 1 with a plurality of flow channels 2. One, two or three holding devices 3 are arranged in a part of the flow channels 2. Thus, a plurality of holding devices 3 may be provided in the at least one flow channel 2. The plurality of holding devices 3 are each arranged on a common side of a flow channel 2. Alternatively or additionally, the holding devices 3 can be arranged on different sides of the flow channel 2, so that the insert elements 4 on the holding devices 3 are opposite each other and/or arranged perpendicular to each other. An insert element 4 is arranged on each of the holding devices 3. By arranging the insert elements 4 in the flow channels, a flow velocity of plastic melt through the flow channels 2 can be reduced. The plastic melt flows more slowly through a flow channel 2 with insert element 4, so that the wall thickness of the associated profile area is smaller.

The invention claimed is:

1. An extrusion nozzle for an extrusion device for extruding plastic profiles, the extrusion nozzle comprising:

at least one nozzle plate which has at least one flow channel for plastic melt, at least one insert element which is inserted into the at least one flow channel in order to reduce a cross-sectional area of the at least one flow channel through which the plastic melt can flow, and at least one holding device is arranged inside the at least one flow channel and is provided in the at least one flow channel, on which the at least one insert element is arranged, wherein:

the at least one holding device forms a receptacle into which the at least one insert element can be inserted and the at least one insert element is held on the holding device along an extrusion direction along which the plastic melt can flow through the at least one flow channel; and the at least one holding device forms at least one undercut including an overhanging portion by means of which:

the at least one insert element is positively fixed in a form fitting to the at least one holding device perpendicular to the extrusion direction along which the plastic melt can flow through the at least one flow channel; or the at least one insert element is wedge-shaped or conical shaped along the extrusion direction along which the plastic melt can flow through the at least one flow channel so that the insert element is held in the holding device in the extrusion direction in a form-fitting and force-fitting manner.

2. The extrusion nozzle according to claim 1, wherein the cross-sectional area of the at least one flow channel through which the plastic melt can flow can be reduced transversely to the extrusion direction along which the plastic melt can flow through the at least one flow channel by means of the at least one insert element.

3. The extrusion nozzle according to claim 1, wherein the at least one insert element is detachably inserted into the at least one holding device.

4. The extrusion nozzle according to claim 1, wherein the at least one holding device is moulded onto a surface of the at least one flow channel along which the plastic melt can flow.

5. The extrusion nozzle according to claim 1, wherein the at least one holding device forms at least one undercut by means of which the at least one insert element is positively fixed to the at least one holding device perpendicular to the extrusion direction along which the plastic melt can flow through the at least one flow channel.

6. The extrusion nozzle according to claim 1, wherein said at least one holding device comprises two webs projecting from a surface of said at least one flow channel.

7. The extrusion nozzle according to claim 6, wherein the two webs extend obliquely to the extrusion direction along which the plastic melt can flow through the at least one flow channel.

8. The extrusion nozzle according to claim 1, wherein the at least one insert element is wedge-shaped along the extrusion direction along which the plastic melt can flow through the at least one flow channel.

9. The extrusion nozzle according to claim 1, wherein the at least one insert element comprises a base part for arrangement on the at least one holding device (3) and a head part for moulding the plastic melt.

10. The extrusion nozzle according to claim 9, wherein the base part is formed in cross-section as a symmetrical trapezium.

11. The extrusion nozzle according to claim 9, wherein the head part protrudes from the base part in a tongue-shaped or T-shaped cross-section.

12. The extrusion nozzle according to claim 10, wherein the head part protrudes from the base part in a tongue-shaped or T-shaped cross-section.

* * * * *